United States Patent
Mepham et al.

(10) Patent No.: US 6,892,598 B2
(45) Date of Patent: May 17, 2005

(54) GEARBOX MECHANISM

(75) Inventors: Shaun E. Mepham, Oxfordshire (GB); Simon P. Bull, Oxfordshire (GB); Roland J. Broadbent, Oxfordshire (GB)

(73) Assignee: Prodrive 2000 Limited, Banbury (GB)

( * ) Notice: Subject to any disclaimer, the term of this patent is extended or adjusted under 35 U.S.C. 154(b) by 139 days.

(21) Appl. No.: 10/089,438
(22) PCT Filed: Sep. 28, 2000
(86) PCT No.: PCT/GB00/03718
§ 371 (c)(1), (2), (4) Date: Jun. 1, 2002
(87) PCT Pub. No.: WO01/23786
PCT Pub. Date: Apr. 5, 2001

(65) Prior Publication Data
US 2004/0221676 A1 Nov. 11, 2004

(30) Foreign Application Priority Data
Sep. 29, 1999 (GB) .............................. 9922875

(51) Int. Cl.⁷ .............................................. B60K 20/02
(52) U.S. Cl. ...................................... 74/473.11; 74/335
(58) Field of Search ........................... 74/473.1, 473.11, 74/473.21, 473.36, 473.37, 335

(56) References Cited
U.S. PATENT DOCUMENTS 5,189,942 A * 3/1993 Ohkubo ........................ 74/335
5,417,124 A * 5/1995 Huff et al. ..................... 74/335
5,623,852 A * 4/1997 Tischer et al. ............. 74/473.21
5,706,712 A * 1/1998 Tischer et al. ................. 74/335
5,722,297 A    3/1998 Tischer et al.

FOREIGN PATENT DOCUMENTS

EP    0 803 651 A    10/1997
GB    1 399 370 A     7/1975

* cited by examiner

Primary Examiner—David A. Bucci
Assistant Examiner—Timothy McAnulty
(74) Attorney, Agent, or Firm—Nixon & Vanderhye P.C.

(57) ABSTRACT

A gear change mechanism is provided which is intended for a gearbox in which changes of the gear ratio in the gearbox are made mechanically in response to actuating signals. The mechanical movements required are as for a conventional gearbox having a H type pattern. A gearbox selector (20) is mounted for movement about an axis and in the direction of the axis. The selector is operable by two actuators (16 and 18), one (16) to move the selector about its axis and the other (18) to move it in the axial direction. Each actuator can be similar having a cylinder and a shaft and annular pistons located about the shaft. For the rotational movement of the selector three positions are required, a neutral, a gear engaged position in one direction and a gear engaged position in the other direction. For movements in the direction of the axis two, three or four positions are required depending upon whether it is a two, three or four rail gearbox. An actuator is proposed which is capable of three, four, or more, positions of movement.

13 Claims, 5 Drawing Sheets

GEARBOX MECHANISM

This application is the U.S. national phase of international application PCT/GB00/03718 filed 28 Sep. 2000, which designated the U.S.

The present invention relates to a gear change mechanism and particularly, but not exclusively, to a gear change mechanism for effecting a gear change in a gearbox of a vehicle.

The present invention aims to provide an improved gear change mechanism.

Accordingly, there is provided in one aspect a gear change mechanism for a gear box in which changes of gear ratio in the gearbox are made mechanically in response to actuating signals, the mechanism including first and second actuator assemblies each connected to a gearbox gear change selector, the selector being movable about an axis and in the direction of said axis to a plurality of positions for effecting changes of gear in the gearbox, the first actuator assembly being arranged to move the selector in said axial direction between a plurality of axial positions, the second actuator assembly being arranged to move a gear change selector about said axis between a plurality of rotational positions, each of the first and second actuator assemblies including cylinder means, a shaft located in the cylinder means and drivingly connected to the selector, and piston means located about said shaft, in each case the cylinder means, shaft and piston means together define chambers into which pressure fluid is selectively introduced so that the shaft is movable to at least three positions.

Preferably, a gear change mechanism is provided wherein the three positions of the shaft of each actuator assembly include two end positions and a position intermediate the ends.

Preferably, the or each cylinder means is divided into four chambers, each chamber being defined by one of said annular pistons and a respective portion of the cylinder means and said chambers are arranged to be selectively supplied with pressure fluid thereby to move said shaft relative to the cylinder.

Said pressure fluid may be pressurised hydraulic fluid or may be pneumatic fluid e.g. air. Alternatively, said first two of said chambers may be supplied with pressurised air and said second two of said chambers may be supplied with pressurised hydraulic fluid.

According to a second aspect of the present invention, there is provided a gear change mechanism for a gearbox in which changes of the gear ratio in the gearbox are made mechanically in response to actuating signals, the mechanism including first and second actuator assemblies each connectable to a gearbox gear change selector, the gear change selector being rotatable about an axis and being movable in the direction of said axis to a plurality of positions for effecting changes of gear ratio in the gearbox, the first actuator assembly including cylinder means and a shaft, the shaft being movable relative to the cylinder means between end positions and an intermediate position between the ends, to rotate the selector about its axis, a second actuator assembly including cylinder means and a shaft, the shaft being movable relative to the cylinder means between the opposite end positions and two positions intermediate its ends, thereby to move the selector to any one of four positions in its direction along said axis.

The present invention will now be described, by way of example only, with reference to the accompanying drawings in which.

Figure 1:
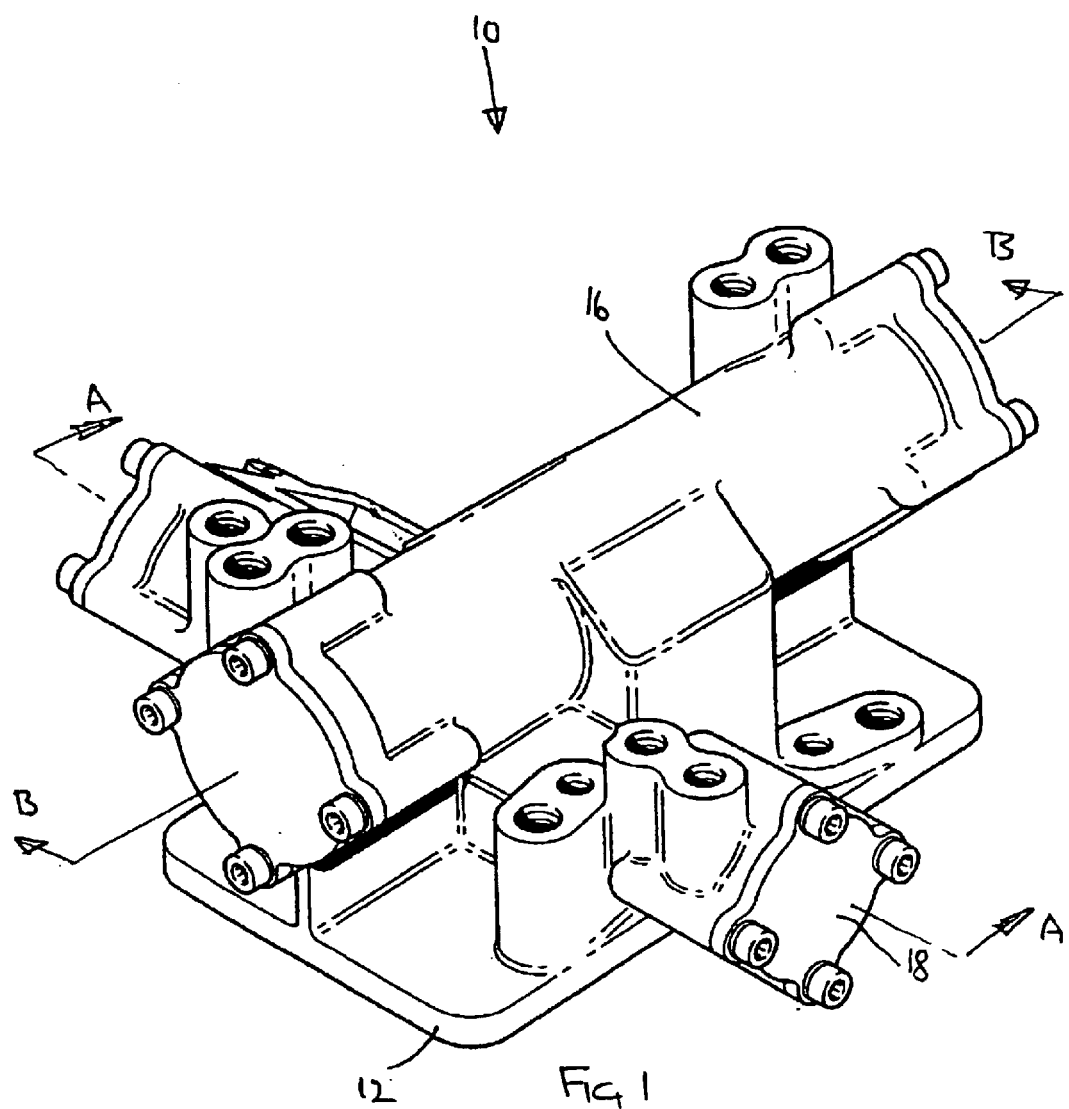
FIG. 1 is a perspective view of a housing of preferred form of gear change mechanism according to the invention.

Referring to FIG. 1, a preferred form of gear change mechanism according to the invention is shown generally at 10. The mechanism is intended to be used primarily, but not exclusively, in an automatic or semi-automatic gearbox arrangement of a vehicle whereby gear changes are initiated by control signals applied to the mechanism which signals may be generated by a computer on the vehicle or manually by the driver of the vehicle.

Figure 3:
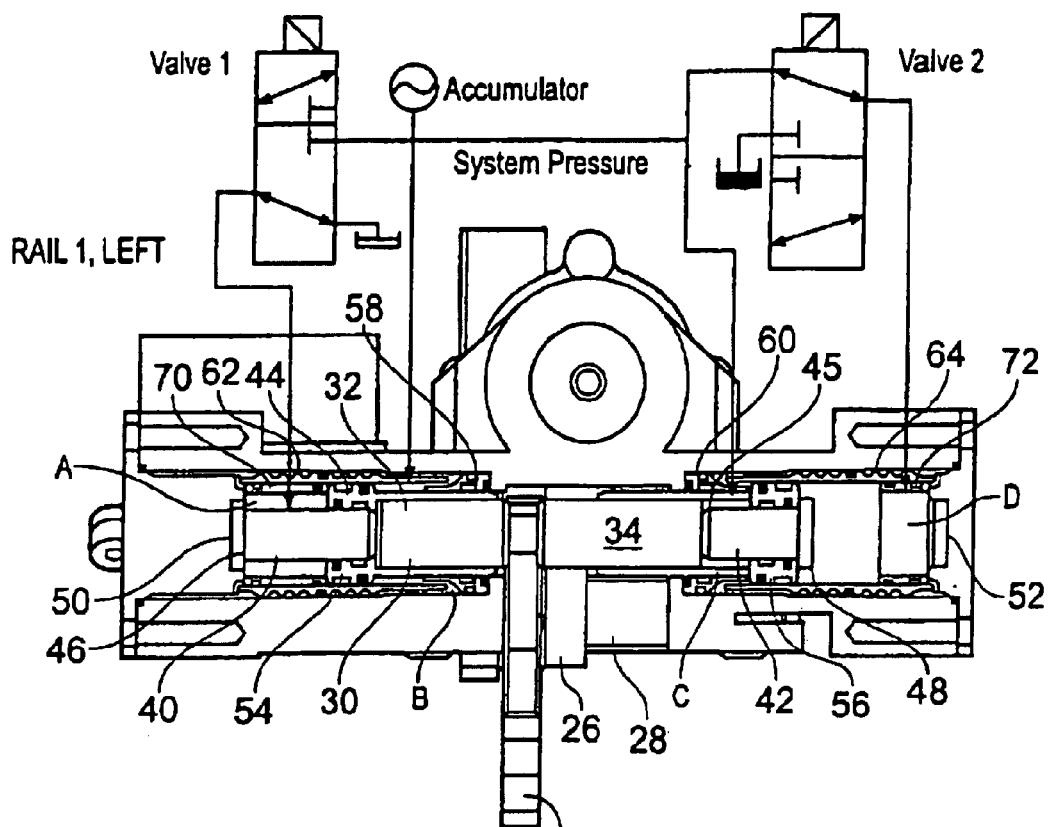
FIG. 3 is a section through the gear change mechanism of FIG. 1 on the line A—A showing a first actuator assembly in a left-most position.
Figure 6:
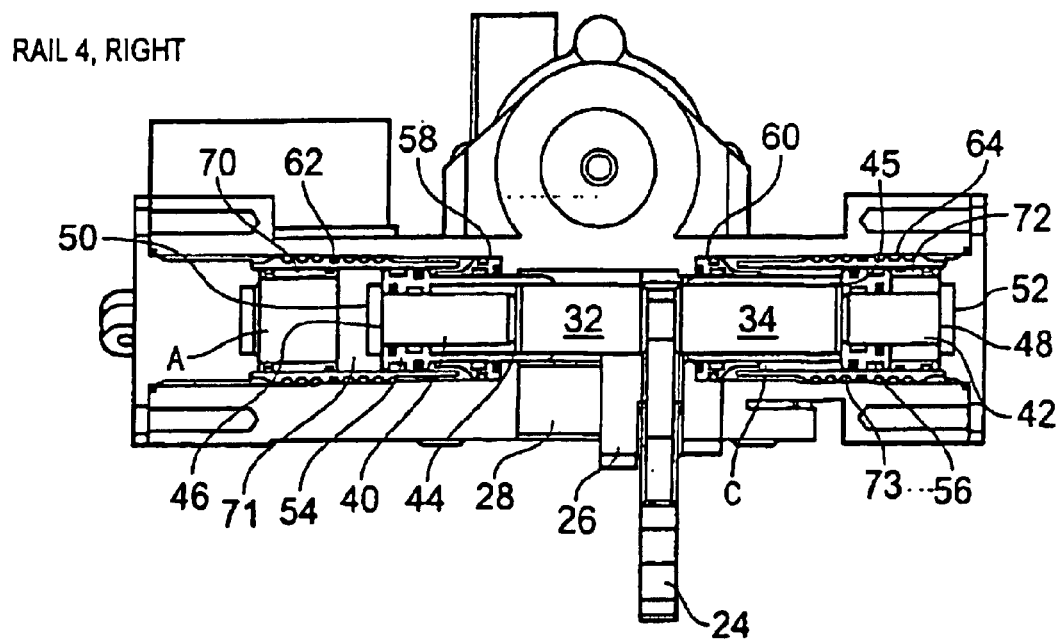
FIG. 6 is a section through the gear change mechanism of FIG. 1 on the line A—A showing a first actuator assembly in a right-most position.
Figure 4:
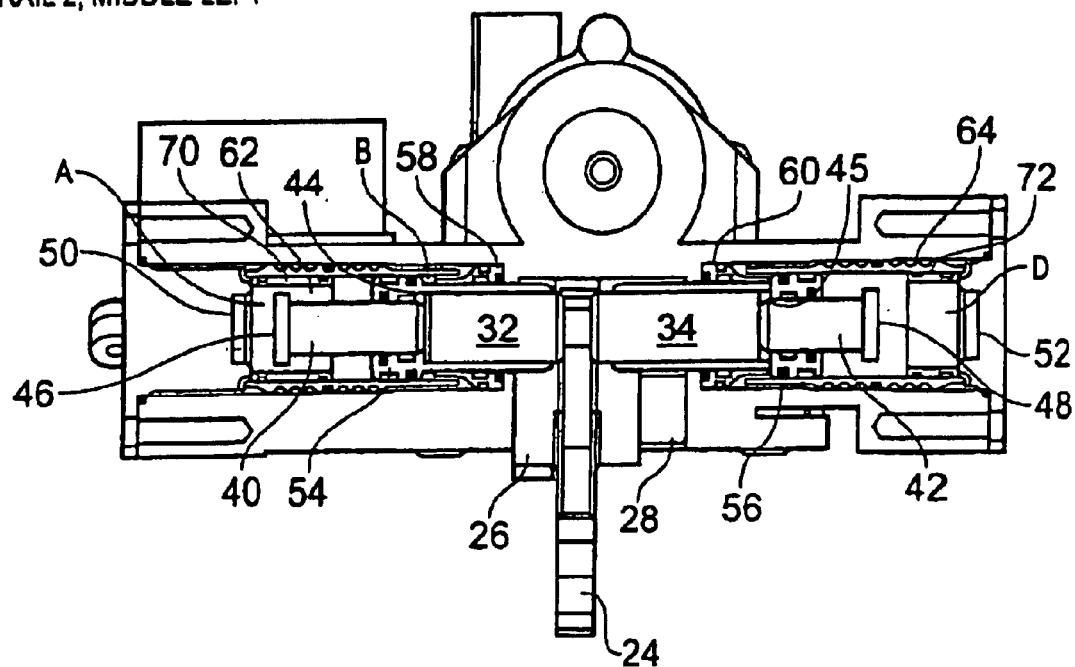
FIG. 4 is a section through the gear change mechanism of FIG. 1 on the line A—A showing a first actuator assembly in a "middle left" position.
Figure 5:
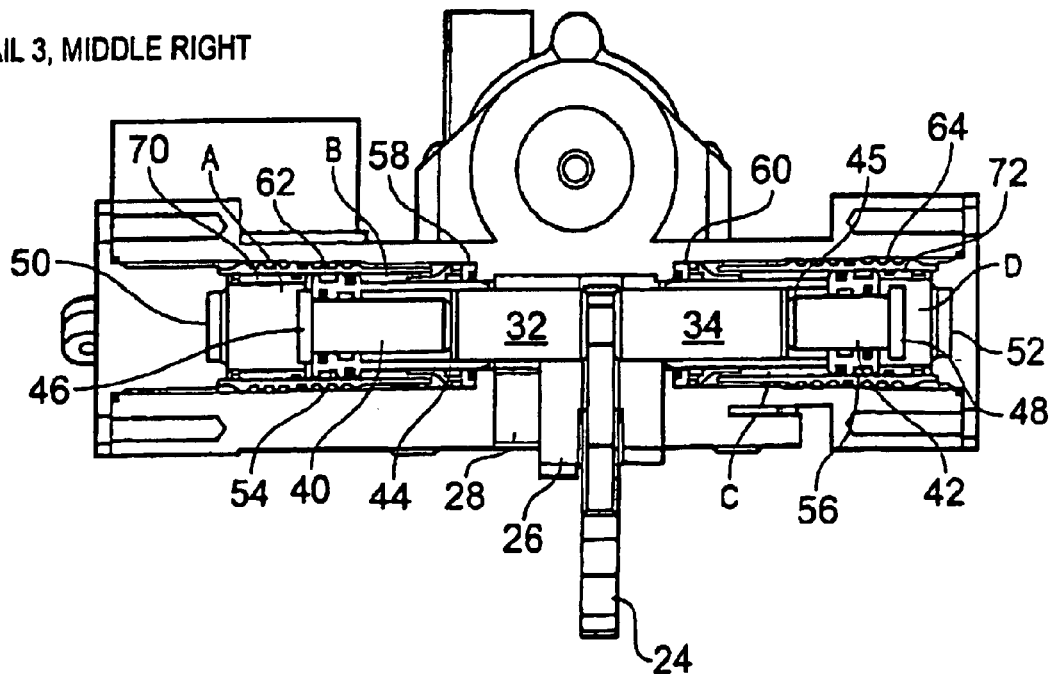
FIG. 5 is a section through the gear change mechanism of FIG. 1 on the line A—A showing a first actuator assembly in a "middle right" position.

In this embodiment, the mechanism 10 is powered hydraulically by pressurised fluid through valves such as shown in FIG. 3. The control input signals referred to above are thus used to activate or deactivate selectively the valve assembly thereby to operate the gear change mechanism.

Figure 2:
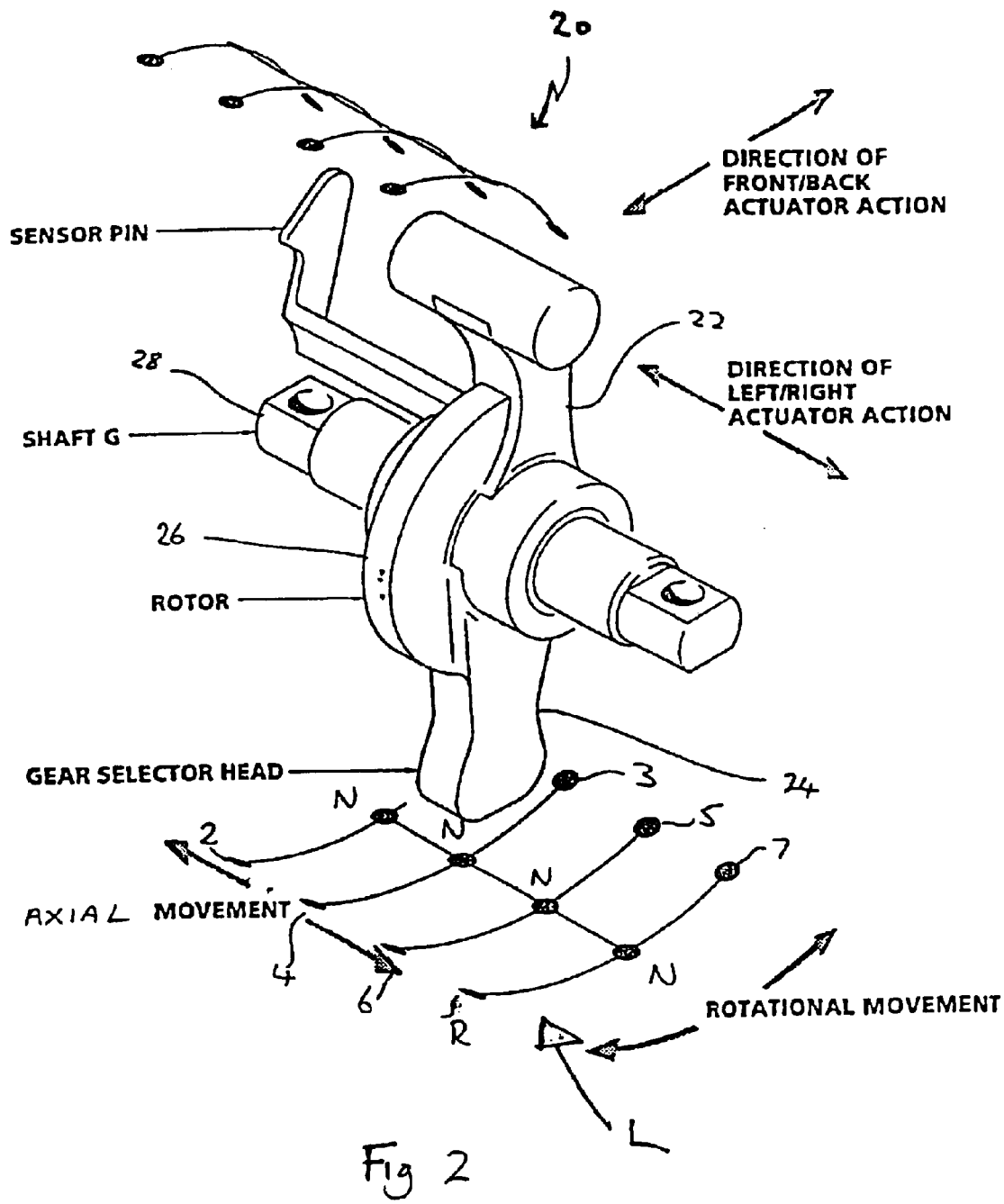
FIG. 2 is a perspective view of a preferred form of gear selector mechanism according to the invention.

The mechanism 10 includes an outer housing 12 providing ports (not shown) for the introduction and discharge of hydraulic fluid to and from the mechanism. A gear selector mechanism 20, shown in detail in FIG. 2, is disposed within a central portion 14 of the housing 12. The housing 12 also contains a first or left/right actuator assembly 18 and a second or front back actuator assembly 16. The first actuator assembly 18 extends perpendicular to and below the second actuator assembly 16.

The gear selector mechanism 20 has an actuator arm 22, the purpose of which is described below, fixed to a substantially annular hub portion 26. A selector finger 24 is also fixed to the hub 26 diametrically opposed to the actuator arm 22. The hub 26 is mounted on a shaft 28 for sliding movement along the shaft and rotational movement about the axis of the shaft, the shaft being fixed within the housing 12.

The finger 24 is arranged to engage with a conventional gearbox (not-shown) in known manner such that movement of the arm in the axial direction of the shaft 28 and rotationally about the shaft causes changes of gear in the gearbox. Specifically, there is shown in FIG. 2 for illustrative purposes a typical gearbox layout L with which the mechanism of the present invention can operate. The layout serves a seven-speed gearbox with four rails being of a so-called "double-H pattern", having gears 1 to 4 in a standard H pattern arrangement, and then a second H pattern arrangement for gears 5 to 7 and reverse. The gearbox could equally have six gears with these rails.

Gears 1 and 2 are therefore opposite one another on the first "rail" of the gearbox, gears 3 and 4 are opposite one another on a second rail of the gearbox and gears 5 and 6 and gears 6 and reverse are opposite one another on third and fourth rails of the gearbox respectively, to provide a so-called four-rail gearbox. Other rear arrangements can also be accommodated by the mechanism 10 but the following description is made in relation to the illustrated arrangement.

As indicated in FIG. 2, rotational movement of the arm 24 about the shaft 28 causes selection between gears which are opposite one another on a common rail, such as between gears 1 and 2, gears 3 and 4, and between gears 5 and 6. Movement of the arm 24 in the axial direction of the shaft 28, on the other hand, causes selection of different rails when the gearbox is in a central position.

In this embodiment, for example, gear selection between gears 1 and 2, gears 3 and 4 gears 5 and 6 and gears 7 and reverse requires only rotational movement of the arm 24, while gear selection between gears 2 and 3, gears 4 and 5, gears 6 and 7 requires both rotational movement of the arm 24 to a central neutral position and then movement of the arm 24 in the axial direction of the shaft 28 to the next rail of the gearbox on which the target gear lies.

Separate drive means, in the form of actuator assemblies 16 and 18 are provided for each of the axial and rotational movements of the gear selector mechanism 20.

Figure 7:
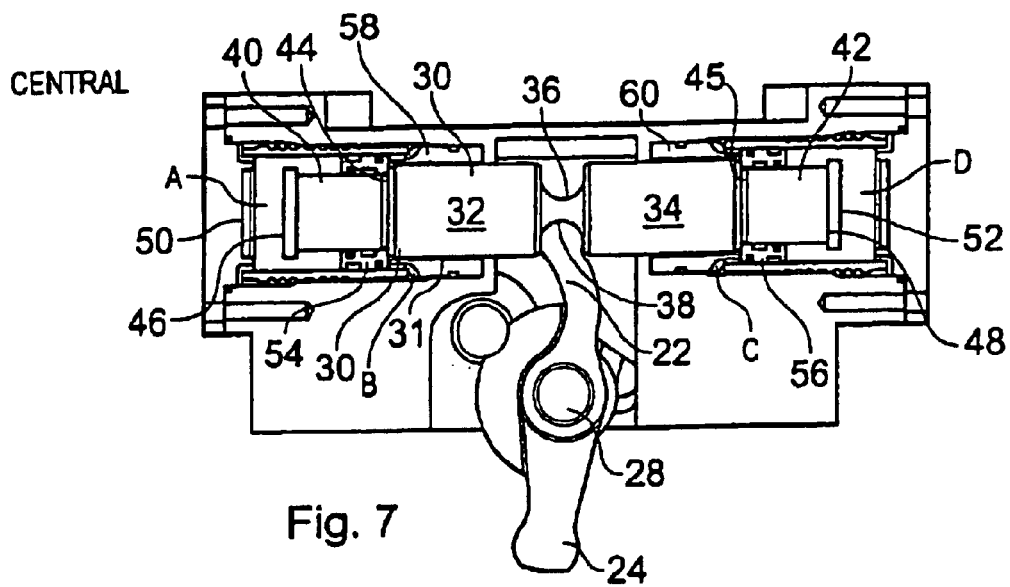
FIG. 7 is a section through the gear change mechanism of FIG. 1 on the line B—B showing a second actuator assembly in a central position.
Figure 8:
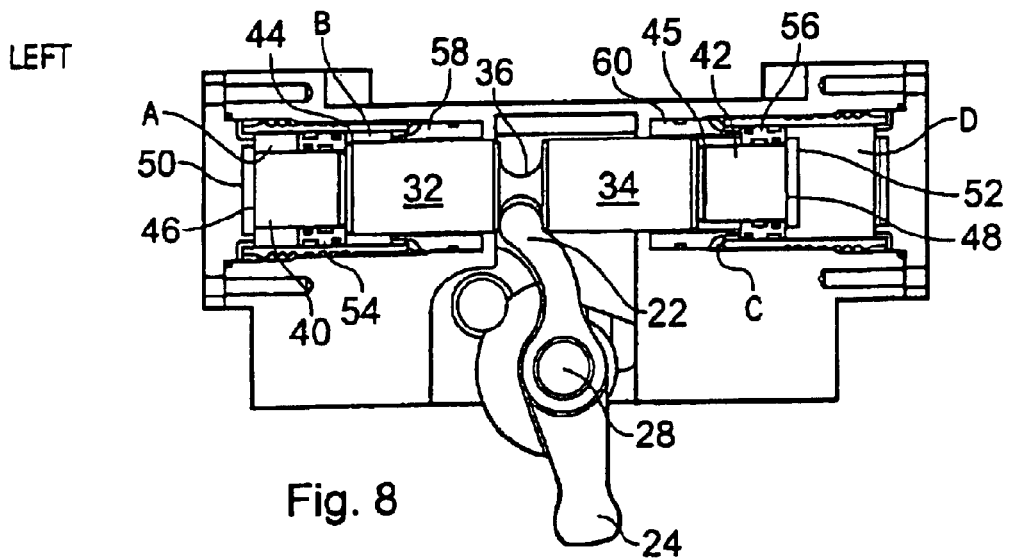
FIG. 8 is a section through the gear change mechanism of FIG. 1 on the line B—B showing a second actuator assembly in a left-most position.
Figure 9:
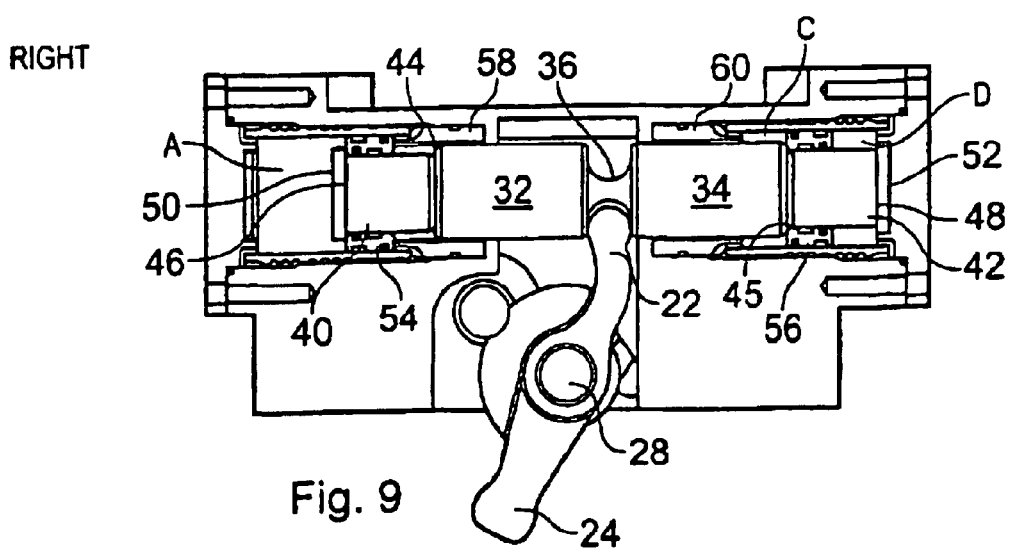
FIG. 9 is a section through the gear change mechanism of FIG. 1 on the line B—B showing a second actuator assembly in a right-most position.

The drive means for the rotational movement of the gear selector mechanism 20 is achieved by actuator assembly 16, a section through which is shown in FIGS. 7 to 9. The actuator assembly 16 has a shaft 30 disposed axially within it for limited axial movement therealong.

The shaft 30 comprises two portions 32, 34 (hereinafter referred to as left- and right-portions (32, 34) joined by means of a central portion 36 of greatly reduced diameter, the portions 32, 34 projecting into respective cylinders 31, 35. The presence of the central portion 36 provides a recess 38 in which an upper portion of the actuator arm 22 of the gear selector mechanism 20 is engaged.

The shaft also comprises end portions 40, 42 disposed on the free ends of portions 32 and 34 respectively, the end portions being of slightly reduced diameter compared to portions 30 and 34. The reduced diameter of the end portions provides a shoulder 44, 45 on the left- and right-portions 32, 34 of the shaft respectively. The free ends of each of the end portions 40, 42 has a snubber in the form of a plate 46, 48 of slightly increased diameter.

Each end of each cylinder 31, 35 is provided with a recess 50, 52 being sized to receive the respective snubber 46, 48 on the shaft 30. The shaft 30 is free is move axially within the cylinders such that when the shaft is at its left-most position, FIG. 8, the snubber 46 is seated in the recess 52.

Each end portion of the shaft 40, 42 has a respective annular piston 54, 56 slidably mounted thereon. Each piston is free to slide along the respective end portion of the shaft but its movement is restricted by the shoulder 44, 45 at one end and the snubber 46, 48 at the other end. Relative movement of the pistons within the cylinder is also restricted by the ends of the cylinders and by a respective abutment means in the form of a sealing collar 58, 60 located adjacent the inner ends middle each cylinder.

The sealing collars 58, 60 and the pistons 54, 56 serve to divide the cylinders into four distinct chambers A to D, chamber A being defined between the left end (as depicted in the drawing) of the cylinder 31 and the piston 54, chamber B being defined between the piston 54 and the left-hand sealing collar, chamber C being defined between the right-hand sealing collar and piston 56 and chamber D being defined between the piston 56 and the right-hand end of the cylinder (35).

Each chamber has a respective port to allow pressurised fluid (hydraulic or pneumatic) to enter and/or to be discharged therefrom. In this embodiment, the feeding of fluid to and discharging from chambers A and D is each controlled by valves similar to those shown for the other actuator, as shown in FIG. 3, valves 1 and 2. The left and right sealing collars 58, 60 defining respective ends of chambers B and C are arranged to allow trapped air and hydraulic fluid within these chambers to be vented to the gearbox cavity.

Movement of the shaft 30 will now be described. Movement of the shaft to a central position (FIG. 7), causing movement of the gear selector assembly into a neutral position, is achieved by actuating the valves mentioned above in order to supply both chambers A and D with pressurised hydraulic fluid. The pressurised fluid forces the pistons 54 and 56 to move towards each other on the shaft and engage the respective shoulders 44, 45. The shaft takes up into a central position with the pistons abutting with both the shaft shoulders 44, 45 and the sealing collars 58, 60.

The movement of shaft causes the actuator arm 22 of the gear selector mechanism 20, engaged in a recess 38, to rotate to a central position corresponding to neutral in the gearbox.

Movement of the shaft to the left (FIG. 8) is achieved by actuating the valves to cause chamber D only to be supplied with pressurised hydraulic fluid. The shaft 30 moves to the left owing to the pressurised fluid in chamber D until the snubber 46 is seated in the recess 50 in the end of the cylinder 31. During this movement of the shaft, the piston 56 remains in abutment with the right-hand sealing collar and the shaft moves relative thereto until snubber 48 is in abutment with the piston. The left-hand piston 54 remains in contact with shoulder 44 on the shaft but moves to the left relative to the cylinder by virtue of the movement of the shaft.

Movement of the shaft to the left causes the gear selector mechanism to rotate (anticlockwise in the drawing) to cause a gear to be selected in the gearbox.

Movement of the shaft to the right (FIG. 9) is achieved in the reverse manner by supplying chamber A only with hydraulic fluid which forces the shaft to the right and thus causes rotation (clockwise in the drawing) of the gear selector mechanism thus causing a change of gear to be selected.

Movement of the gear selector mechanism 20 in the axial direction of the shaft 28 is achieved by actuator assembly 18, FIGS. 3 to 6. The actuator assembly 18 is essentially similar to the actuator assembly 16 but with a number of minor modifications. Firstly, chambers A and D have a portion 70, 72 adjacent the ends of the cylinders 71, 73 having a reduced diameter. This portion of reduced diameter provides abutments 62 and 64 past which the pistons are unable to move. Secondly, the left-hand end portion 40 of the shaft 30 is longer than the right-hand end portion 42 and the right-hand portion 34 of the shaft 30 is longer than the left-hand portion 32. The combined length of the left-hand portion 32 and end portion 40 is substantially similar to the combined length of the left-hand portion 34 and end portion 42. The actuator assembly 18 of FIGS. 3 to 6 is arranged to move to four different positions, corresponding to the four rails of a seven-speed gearbox.

Chambers B and C are linked together by piping and connected directly to a constant pressure source. The constant pressure source is a gas accumulator or other compliant means which provides a constant gas pressure to chambers B and C with the gas acting as a spring. Thus, chambers B and C are "actuated" if a greater opposite force (caused by pressure fluid in chambers A or D) is not present.

Chambers A and D are controlled by two separate valves 1 and 2 (FIG. 3) to selectively supply pressurised hydraulic fluid thereto.

Movement of the actuator assembly 18 to each of the four positions will now be described. To move the shaft to its left-most position (FIG. 3), chamber D is supplied with pressurised hydraulic fluid which forces the shaft 30 to move to the left until the snubber 46 engages with the recess 50 in the end of the cylinder. The movement of the shaft to the left causes the right-hand snubber 48 to abut with the piston 56 which is thus moved to the left also until it abuts with the right-hand sealing collar 60. The force pushing on the piston from chamber C is overcome due to a 2:1 piston area ratio of chamber D over chamber C. Movement of the shaft to its left-most position causes the gear selector mechanism to slide axially along the shaft 28 to a position corresponding to, for example, the first rail on the gearbox on which gears 1 and 2 are located.

From the left-most position, the shaft 30 is moved to a "middle left" position (FIG. 4) in order to move the gear selector assembly to a different rail of the gearbox. This is achieved by supplying pressurised hydraulic fluid simultaneously to chambers A and D such that pistons 54, 56 move towards each other on the shaft and engage the respective shoulders 44, 45. The shaft thus moves into a central position with the pistons abutting with both the shaft shoulders and the sealing collars. Again, the force pushing on the pistons from chambers B and C is overcome due to the 2:1 piston area ratio of chambers A and D over chambers B and C.

It will be appreciated that this operation is similar to moving the shaft of the first actuator assembly 16 to its middle position. In this case, however, the difference in length of the left portion 32 of the shaft compared with the right portion 34 means that the shaft 30 is moved to a position offset to the left of the central position.

From the middle-left position, the shaft is moved to a middle-right position (FIG. 5) to move the gear selector assembly to the third rail of the gearbox. In this case, both chambers A and D are vented to allow the constant fluid pressure in chambers B and C, supplied by the accumulator, to move the pistons 54, 56 away from each other. Owing to the shorter right-end portion 42 of the shaft 30, the right-hand piston 56 collides with the right snubber 48 before the left-hand piston 54 collides with the left snubber 46 and the shaft 30 is therefore moved to the right. The right-hand piston 56 collides with the narrower portion of chamber D whilst the left piston 54 collides simultaneously with the narrower portion of chamber A and the left-hand snubber 46. The shaft 30 is thus moved to a position slightly offset to the right of centre.

From the middle-right position the shaft is moved to the fully-right position (FIG. 6) in a manner opposite to the movement of the shaft fully to the left. In other words, chamber A is filled with pressurised hydraulic fluid which moves the shaft to the right until the right-hand snubber 48 engages with the right-hand recess 52 in the end of the cylinder. At the fully right position of the shaft, the right-hand piston 56 is trapped between the shoulder 45 on the shaft and the narrower portion of the chamber D whilst the left-hand piston 54 is trapped between the left snubber 46 and the left-hand sealing collar 58. Movement of the shaft to the fully-right position causes movement of the gear selector mechanism to the last rail on the gearbox. The four positions—left, middle left, middle right and right are generally equally spaced from one another.

It will be appreciated that the three position movement of actuator assembly 16 and the four position movement of actuator assembly 18 allows the selector of eight different gears with the centre position of the three position actuator assembly representing a neutral gear position. Both of the above described actuator assemblies are provided with only two valves which reduces the control inputs needed to actuate the gear change. It is quite possible, of course, that more valves may be used as necessary in order to selectively supply particular chambers with pressure fluid and little or no modifications to the gear change mechanism are needed to incorporate such alternatives.

While the above embodiment is described in respect of a seven-speed gearbox, the mechanism may equally be applied to a five-speed gearbox in which case the actuator assembly 18 may be replaced by a three-position actuator assembly, the same or similar to that of actuator assembly 16. The gear change mechanism may be used with any existing gearbox layout.

It will be appreciated that the gear change mechanism of the present invention allows for a large number of gears to be selected in a gearbox using a minimum number of valves or associated control mechanisms. This reduces the control inputs required to effect a gear change.

What is claimed is:

1. A gear change mechanism for a gearbox in which changes of gear ratio in the gearbox are made mechanically in response to actuating signals, the mechanism including first and second actuator assemblies each connected to a gearbox gear change selector, the selector being movable about an axis and in the direction of said axis to a plurality of positions for effecting changes of gear in the gearbox, the first actuator assembly being arranged to move the selector in said axial direction between a plurality of axial positions, the selector having a radially outwardly directed arm, the second actuator assembly being directly drivingly connected to said arm to transmit reciprocal movement of the actuator to provide rotational movement of the selector about said axis between a plurality of rotational positions, each of the first and second actuator assemblies including a cylinder, a shaft located in the cylinder and drivingly connected to the selector, and a piston located about said shaft for movement axially of said shaft, and in each case the cylinder shaft and piston together define chambers into which pressure fluid is selectively introduced so that the shaft is movable to at least three different axial positions, wherein the shaft of the first actuator is substantially perpendicular to the shaft of the second actuator, and the gear change mechanism comprises two fluid control valves being selectively operable to admit fluid to the chambers and thereby move the shaft, and wherein the cylinder shaft and piston provide four chambers within the cylinder, and each chamber is connectable to a source of pressure fluid, connection being selectable to effect movement of the shaft to any one of said positions.

2. A gear change mechanism according to claim 1 comprising an inlet to admit pressure fluid to said chambers, fluid being admitted to said first pair of chambers to locate said shaft in an intermediate position, fluid being admitted to one of said second pair of chambers to move the shaft towards one or other end of the cylinder.

3. A gear change mechanism according to claim 2, wherein the annular pistons are each located about an associated, reduced-section portion of the shaft and each piston is movable axially of the shaft in limited extent which is defined by the length of the reduced-section portion.

4. A gear change mechanism according to claim 3 wherein the length of the reduced-section portions towards each end of the shaft is different.

5. A gear change mechanism according to claim 1 wherein said chambers are arranged to define a first pair of chambers at opposite ends of the cylinder, and each chamber of the pair being defined by the shaft, one end of an annular piston located around the shaft and the associated end of the cylinder.

6. A gear change mechanism according to claim 5, wherein the chambers are arranged to define a second pair of chambers and each chamber of the second pair is defined by the shaft, by the opposite end of the annular piston and by a part of the cylinder located inwardly of the ends of the cylinder.

7. A gear change mechanism for a gearbox in which changes of the gear ratio in the gearbox are made mechanically in response to actuating signals, the mechanism including first and second actuator assemblies each connectable to a gearbox gear change selector, the selector having a radially outwardly directed arm, the second actuator assembly being directly drivingly connected to said arm to transmit reciprocal movement of the actuator to the selector, the gear change selector being rotatable about an axis and being movable in the direction of said axis to a plurality of positions for effecting changes of gear ratio in the gearbox, the first actuator assembly including a cylinder and a shaft, being movable relative to the cylinder between end positions and an intermediate position between the ends, to rotate the selector about its axis, a second actuator assembly including a cylinder and a shaft, the shaft being movable relative to the cylinder between the opposite end positions and two positions intermediate its ends, thereby to move the selector to any one of four positions in its direction along said axis, wherein the shaft of the first actuator is substantially perpendicular to the shaft of the second actuator, and two fluid control valves control the movement of the shaft, and wherein the actuator assemblies each include a pair of annular pistons located about the associated shaft and four fluid chambers are defined within the associated cylinder between the shaft, the annular pistons, and the cylinder and each chamber is connectable to a source of pressure fluid.

8. A gear change mechanism according to claim 7 wherein said chambers are arranged to define a first pair of chambers at opposite ends of the cylinder, each chamber of said first pair being defined by the shaft, one end of one of the pair of annular pistons and the associated end of the cylinder.

9. A gear change mechanism according to claim 8 wherein a second pair of chambers is located within the cylinder and each chamber of the second pair is defined by the shaft by the opposite end of one of the annular pistons, and by a part of the cylinder located inwardly of the ends of the cylinder.

10. A gear change mechanism according to claim 9 wherein, during operation, there is a constant supply of pressure fluid to both of said second chambers.

11. A gear change mechanism according to claim 9 wherein pressure fluid is admitted to both said second chambers and not to either of said first chambers, to move the shaft to the other of said intermediate positions.

12. A gear change mechanism according to claim 8 wherein the shaft is movable towards one end of the cylinder by the admission of fluid to one of the pair of first chambers situated at the opposite end of the shaft to said one end, to provide two end positions of the shaft.

13. A gear change mechanism according to claim 8 wherein the shaft is movable towards one of said two intermediate positions by admitting fluid to both said first chambers.

* * * * *

UNITED STATES PATENT AND TRADEMARK OFFICE
CERTIFICATE OF CORRECTION

PATENT NO.          : 6,892,598 B2
APPLICATION NO.  : 10/089438
DATED                   : May 17, 2005
INVENTOR(S)          : S. Mepham et al.

It is certified that error appears in the above-identified patent and that said Letters Patent is hereby corrected as shown below:

Title page item (86) should read

(86)   PCT No.:        PCT/GB00/03718
       § 371 (c)(1),
       (2), (4) Date:   July 1, 2002

Signed and Sealed this

Sixteenth Day of October, 2007

JON W. DUDAS
*Director of the United States Patent and Trademark Office*